March 5, 1940.   E. R. POWELL   2,192,524
APPARATUS FOR THE MANUFACTURE OF MINERAL WOOL
Filed July 20, 1935
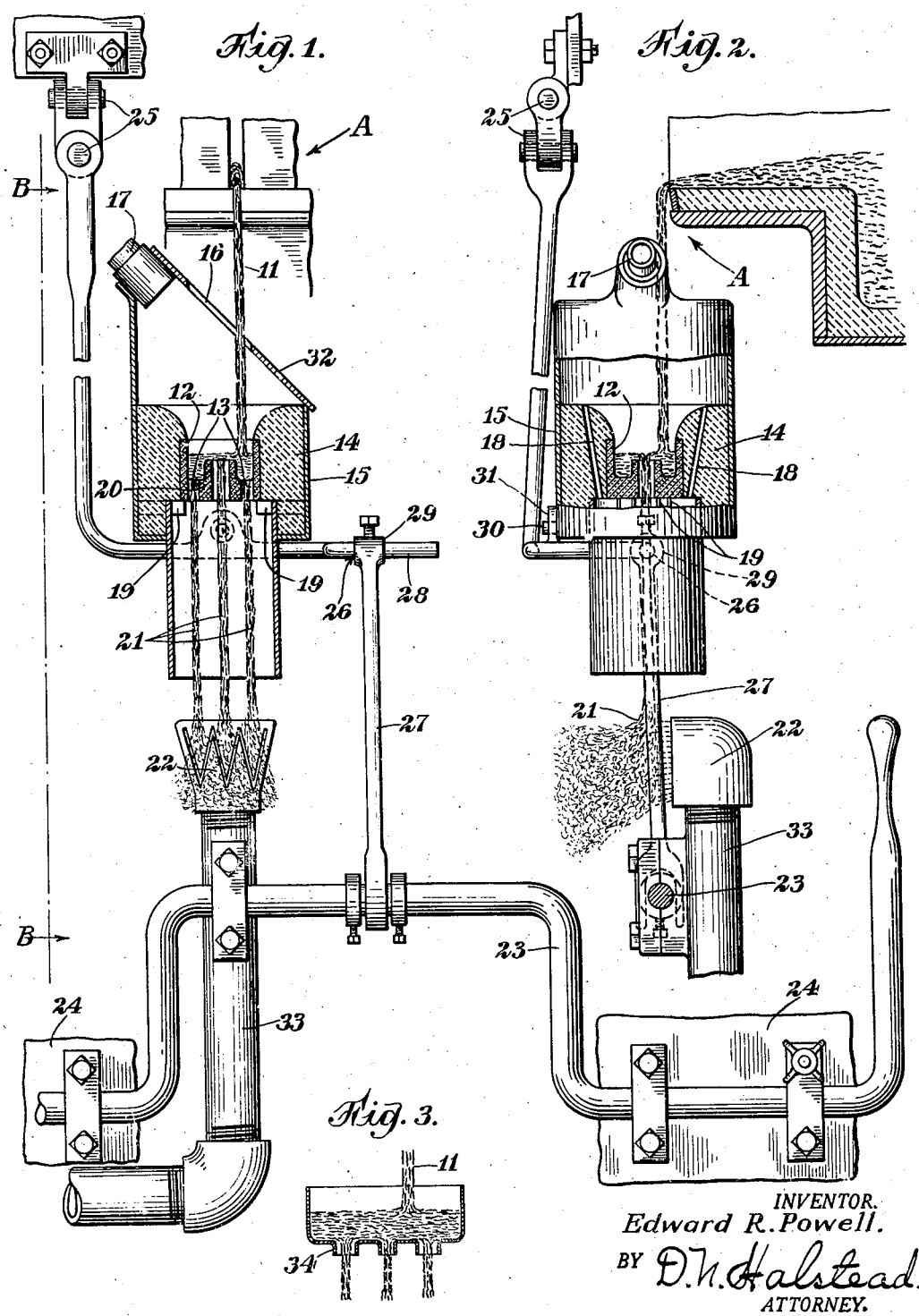
INVENTOR.
Edward R. Powell.
BY D. N. Halstead.
ATTORNEY.

Patented Mar. 5, 1940

2,192,524

UNITED STATES PATENT OFFICE 2,192,524

APPARATUS FOR THE MANUFACTURE OF MINERAL WOOL

Edward R. Powell, Alexandria, Ind., assignor to Johns-Manville Corporation, New York, N. Y., a corporation of New York Application July 20, 1935, Serial No. 32,332

9 Claims. (Cl. 49—1)

This invention relates to an apparatus for the manufacture of mineral wool and particularly to means for the subdivision of the molten raw material into stream form suitable for being converted into fibres.

This application is a continuation, in part, of my application, Serial Number 720,980, filed April 17, 1934, which issued as Patent No. 2,126,411 August 9, 1938, for method for making mineral wool.

I have discovered that the fiberizing of suitable molten material into mineral wool gives an improved product when the stream of molten material delivered to the fiberizing gas, such as steam or the like, is small. Difficulties have been encountered however, in the economical operation of a cupola or other conventional furnace unless the desirably small stream of effluent molten material is one of a plurality of such streams giving adequate total capacity and rate of discharge from the furnace.

Also, there has been difficulty, heretofore, in the simultaneous formation and blowing of a plurality of such streams. A stream of the molten siliceous raw material, passing over a subdividing or stream-forming member of ceramic ware or material having a substantial amount of superficial coating of oxidic substance, wets the member, causing non-uniform retardance of various parts of the stream, with attendant variations in speed, wavering of direction and/or causing solution of the composition or oxidic coating of the said member.

The present invention comprises the means described for subdividing a molten material suitable for mineral wool manufacture into a small stream and, preferably, into a plurality of streams of size preferred for the fiberizing operation. In the preferred embodiment, the invention comprises the use of a subdividing member that is substantially free, in its portions in contact with the molten material, from oxidic or other substances that are appreciably soluble in the said material. In one embodiment the invention includes a member provided with a plurality of apertures for subdividing the molten material into a plurality of small streams and means for delivering against the said streams a blast of fiberizing gas that is continuous from side to side and of width greater than the distance between the outermost of the said streams. The invention comprises, also, a multiple nozzle for delivering against the molten material a stream of gas that is continuous from one side to the other side of the nozzle and that includes, advantageously, a plurality of communicating outlets that are individually V-shaped.

The invention is illustrated in the drawing and will be described in connection therewith.

Fig. 1 is a front elevation, partly in section, of novel parts of my apparatus.

Fig. 2 is a side elevation, partly in section, of the assembly shown in Fig. 1, the view being in the direction of the arrows BB.

Fig. 3 is a sectional view of a splitting member of modified form adapted to be substituted for the subdividing member of Figs. 1 and 2.

In utilizing the improved apparatus, there is provided a stream 11 of suitable molten material. The material, for example, may be the siliceous slag resulting from melting, in a cupola or other suitable furnace, rock or slag and additions or admixtures of the kind commonly used in the manufacture of mineral wool. The outlet portion of such a furnace is indicated generally at "A".

The stream of molten material is allowed to fall upon the subdividing member 12, provided with a plurality of spaced apertures or orifices 13. To promote smoothness of flow of the molten material through the said apertures and prevent coalescence of the resulting streams, the member 12 is constituted of a composition that is not dissolved, melted, or unduly softened by the molten material passing thereover. Owing to the close association of the melt with the subdividing member, it is inevitable that the said member approaches the temperature of the melt. This temperature is normally 2400 to 2800° F.; materials constituting the subdividing member will, therefore, be destroyed unless specially selected to withstand the very high temperatures met in their contact with the molten material. Most materials that are sufficiently refractory to resist the temperature alone, such as silica, fireclay, magnesite, metallic oxides and the like, are readily dissolved in the melt.

For these reasons the composition used for the member 12 is preferably one that contains no substantial amount of an ingredient, or that during use forms no substantial amount of a superficial coating of oxidic material, that is soluble in the said melt or that may cause retarding or dragging of the stream at any position on the member 12. Thus, the said member may be constituted of graphite, a high-melting non-ferrous alloy of tungsten, chromium, and/or nickel, platinum, or other material that will not form a substantial amount of a surface coating of an oxide, melt, or dissolve under the conditions of use. The oxidic coating, when not "substantial" in amount, does not scale off as slag passes thereover. The graphite, if used, should be very low in or have no substantial binder content that is soluble in the said molten material or fusible at the temperature of use. Thus, graphite compositions, such as used for electrodes, may constitute the subdividing member 12.

In order to provide insulation against the loss of heat and access of air, the subdividing member 12 is enclosed on its side edges in suitable insulation 14, such as diatomaceous earth in slightly bonded condition, the whole being inside the structure including the housing 15 and the hood 32. The hood is provided with an opening 16 through which the stream 11 of molten material may enter. Also, the hood is provided with an inlet for a burner 17 adapted to direct a gas flame against the molten material. Passages 18, extending from the combustion space above the member 12 to the space therebelow, permit the passage of the combustion gases under the said member and the maintenance of a reducing atmosphere, not only above but also below the subdividing member. The subdividing member and the molten material therein are thus maintained above the melting point of the said material. As illustrated, also, the member permits the flow through the apertures 13 of the molten material in the form of a plurality of closely adjacent or closely spaced small streams.

The member 12 is supported in any suitable way, as, for example, upon lugs 19 of nichrome. The housing 15 may be constructed of the same or similar heat-resisting material.

Since the member 12 is continuously losing heat through its outer portions, these outer portions will be cooler than the central portion. For this reason, means are provided to offset the somewhat greater viscosity of the molten material flowing through the holes in the outer portions of the said member than of the material flowing through the hole or holes in the inner portion. Thus, the outer holes in the member may be made somewhat larger in diameter than the central hole (see Fig. 3); or, a greater head of liquid may be maintained above the outer holes, as by raising the level of the entrance to the inner hole, as illustrated at 20.

The resulting streams 21 fall in front of and close to the nozzle 22, suitably a multiple nozzle, from which the gas, such as steam, is issuing. The nozzle may consist of a series of orifices, each of V-shape of cross section and each connected at a side to a similar orifice. The nozzle gives a continuous band of steam or the like, of width somewhat greater than the distance between the outermost streams 21. The gas is fed to the nozzle through the pipe 33.

The position of the subdividing member 12 may be shifted with respect to the stream 11, so that the stream may be caused to fall upon any selected portion of the subdividing plate. This shifting may be effected by means including the support bar 23, rotatably mounted with respect to elements 24 of a substructure, and rod 27. The said rod is slidable to the left or right of the assembly, as illustrated in Fig. 1. Movement is possible on the pivot points 25 and 26.

The position of the multiple nozzle 22 may be fixed with respect to the subdividing plate 12, as by the connecting member or rod 27 mentioned above; or, the position of the nozzle with respect to the subdividing member may be adjusted, as by movement of the supporting bar 28 with respect to the sleeve 29 on the said rod 27.

Also, the level of the subdividing member 12 may be adjusted, as by tilting, accomplished by rotation of the housing 15 on the pivot 30 supported on lug 31. This tilting makes possible the adjustment of the relative depths of molten material over the entrances to the several orifices 13, whereby the sizes of streams (amounts of material) issuing therefrom may be varied.

In the modification shown in Fig. 3, the subdividing member is provided with means, such as the lips 34 extending each around and downwardly from the outlet of one of the openings 13, for preventing the streams from crawling laterally over the bottom of the subdividing member and for avoiding thus coalescence of the several small streams into a single large stream or into a smaller number of streams. This modified form is constructed suitably of one of the alloys or materials described above.

Using the apparatus described, it is possible to operate a mineral wool melting furnace at a capacity that is economical and that also gives smoothness of operation, while controlling approximately, at will, the size of the individual stream of molten material that is converted into wool. Because of the smoothness of flow of the molten material through the apertures of the subdividing member of graphite or the like, it is possible to form streams suitable for fiberizing that correspond each to a flow of the order of 250 pounds or less to the hour. Such streams, when fiberized, give a mineral wool that, after felting, is of very low density, as compared to mineral wool blown from a similar composition delivered to the nozzle in the form of the larger streams heretofore used.

Also, there may be delivered by the means described smooth streams corresponding to 65 pounds an hour or less of molten material; these very small streams, when fiberized, give a special result because of the quick cooling to which such small streams are subject. Thus, such a small stream may be converted into mineral wool of long coarse fibres of diameter each of the order of the thickness of the metal of a common hat pin.

When a number of streams are caused to flow past a multiple orifice or an orifice delivering, under pressure, a wide band of fiberizing gas, some variation in position of the individual streams, with respect to the nozzle, is permitted without interference with the operation of blowing.

While the drawing shows three streams 21, being formed by the flow of the molten material through the subdividing member, it is to be understood that a different number of streams may be so formed, as, for example, four or five or more.

It is to be understood, also, that the details given are for the purpose of illustration, not restriction, and that variations within the spirit of the invention are to be included within the scope of the appended claims.

What I claim is:

1. An apparatus for making mineral wool from a suitable molten material comprising a member provided in its central and outer portions with a plurality of discrete apertures permitting flow of the molten material therethrough, the said member being warmer at its central portion than at its outer portions during operation of the apparatus, and the apertures being smaller in the central portion than in the outer portions and minimizing by difference in size the differences in rates of flow due to the temperature variation between the said portions of the member.

2. An apparatus for making mineral wool comprising means for delivering suitable molten material in the form of a stream, a member provided with a plurality of apertures for dividing the said stream into a plurality of small streams, and means for delivering against the said streams a blast of shredding gas, the said apertures being adapted each to permit the flow therethrough of the molten material in amount of the order of 65 pounds per hour.

3. In an apparatus for making mineral wool from a molten material, a receptacle for the molten material, said receptacle being provided with discrete outlet openings for the molten material, said openings being distributed over an area which has a temperature differential during operation of the apparatus, and the sizes of the openings varying in accordance with the temperature differential to produce substantially uniform rates of flow through the openings.

4. In an apparatus for making mineral wool from a molten material, a receptacle for the molten material, said receptacle being provided with discrete outlet openings for the molten material, said openings being distributed over an area which has a temperature differential during operation of the apparatus, the sizes of the openings varying inversely with the temperatures of their respective positions to produce substantially uniform rates of flow through the openings, and heat producing means operative upon the receptacle to maintain the same above the solidifying temperature of the molten material and of a character to create a reducing atmosphere to minimize oxidation of the receptacle by the molten material.

5. In an apparatus for making mineral wool from a molten material, a receptacle for the molten material, said receptacle being provided with discrete outlet openings for the molten material, said openings being distributed over an area which has a temperature differential during operation of the apparatus, the sizes of the openings varying inversely with the temperatures of their respective positions to produce substantially uniform rates of flow through the openings, and heat producing means operative upon the receptacle to maintain the same above the solidifying temperature of the molten material.

6. In an apparatus for making mineral wool from a molten material, a receptacle for the molten material, said receptacle being provided with discrete outlet openings for the molten material, said openings being distributed over an area of the receptacle which has a temperature differential during operation of the apparatus, the openings in the high temperature portion of the area being smaller than the openings in the low temperature portion of the area to thereby produce substantially uniform rates of flow through the openings, a hood for the receptacle to protect the same from air currents, and a burner for maintaining the temperature of the receptacle above the solidifying temperature of the molten material.

7. Apparatus for making mineral wool comprising furnace means for receiving and converting raw material into a molten stream, a receptacle for receiving the molten stream, said receptacle being provided with a plurality of openings for discharging said molten material in smaller discrete streams, said openings being distributed over a portion of said receptacle which has a temperature differential during operation of the apparatus, the sizes of the openings varying inversely with the temperatures of their respective positions to produce substantially uniform rates of flow through the openings, flame means for heating said receptacle to a temperature above that at which the molten material solidifies and for creating a reducing atmosphere to minimize oxidation of the receptacle by the molten material, and nozzle means for directing a blast of gaseous medium moving at high velocity against said streams to convert the same into fibres.

8. Apparatus for making mineral wood comprising furnace means for receiving and converting raw material into a molten stream, a receptacle for receiving the molten stream, said receptacle being provided with a plurality of openings for discharging said molten material in smaller discrete streams, said openings being distributed over a portion of said receptacle which has a temperature differential during operation of the apparatus, the sizes of the openings varying inversely with the temperatures of their respective positions to produce substantially uniform rates of flow through the openings, and nozzle means for directing a blast of gaseous medium moving at high velocity against said streams to convert the same into fibres.

9. Apparatus for making mineral wool comprising furnace means for receiving and converting raw material into a molten stream, a receptacle for receiving the molten stream, said receptacle being provided with a plurality of openings for discharging said molten material in smaller discrete streams, said openings being distributed over a portion of said receptacle which has a temperature differential during operation of the apparatus, the sizes of the openings varying inversely with the temperatures of their respective positions to produce substantially uniform rates of flow through the openings, flame means for heating said receptacle to a temperature above that at which the molten material solidifies and for creating a reducing atmosphere to minimize oxidation of the receptacle by the molten material, and a nozzle for directing a blast of gaseous medium against said streams to convert the same into fibres, the nozzle outlet being in the shape of successive and connected V's and of such size that each stream is contacted by a jet which is substantially V-shaped.

EDWARD R. POWELL.